(12) United States Patent
Andersson (10) Patent No.: US 10,872,473 B2
(45) Date of Patent: Dec. 22, 2020

(54) EDGE WELDING OF GEOMETRIES HAVING DIFFERING RESOLUTIONS

(71) Applicant: Microsoft Technology Licensing, LLC, Redmond, WA (US)

(72) Inventor: Dan Ronny Andersson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/811,457

(22) Filed: Nov. 13, 2017

(65) Prior Publication Data

US 2018/0330551 A1 Nov. 15, 2018

Related U.S. Application Data

(60) Provisional application No. 62/503,854, filed on May 9, 2017.

(51) Int. Cl.
| | |
|---|---|
| *G06T 19/20* | (2011.01) |
| *G06T 15/00* | (2011.01) |
| *G06T 3/40* | (2006.01) |
| *G06T 17/20* | (2006.01) |
| *G06T 3/00* | (2006.01) |

(52) U.S. Cl.
CPC ............ *G06T 19/20* (2013.01); *G06T 3/0081* (2013.01); *G06T 3/403* (2013.01); *G06T 15/00* (2013.01); *G06T 17/205* (2013.01); *G06T 2210/36* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 5,621,827 A | | 4/1997 | Uchiyama et al. |
| 5,655,063 A | * | 8/1997 | Crocker ................. G06T 17/00 345/420 |
| 7,006,111 B1 | | 2/2006 | Rothrock |
| 8,120,607 B1 | | 2/2012 | Legakis et al. |

(Continued)

OTHER PUBLICATIONS

Wiebe Van Ranst, "GPU Accelerated Mesh Simplification using OpenCL", 2013, retrieved from https://iiw.kuleuven.be/onderzoek/eavise/mastertheses/wiebe-vanranst.pdf on Jul. 29, 2019.*

(Continued)

*Primary Examiner* — Zhengxi Liu
(74) *Attorney, Agent, or Firm* — Alleman Hall Creasman & Tuttle LLP (57) ABSTRACT

A method for rendering a 3D object comprises receiving data for a first 3D object at a first resolution, and receiving data for a second 3D object at a second resolution, lower than the first resolution. Each shared border between the first 3D object and the second 3D object includes one or more shared edges that include corresponding edges of the first and second 3D objects. Relative resolutions are identified for each shared edge of the shared border. An adjusted version of the first 3D object is generated, wherein for at least some shared edges of the shared border, the resolution of the edge of the first 3D object is adjusted to be equal to the corresponding edge of the second 3D object. The adjusted version of the first 3D object is rendered, and the second 3D object is rendered.

20 Claims, 6 Drawing Sheets

(56) References Cited

U.S. PATENT DOCUMENTS

| | | |
|---|---|---|
| 8,600,193 B2 | 12/2013 | Kalayeh |
| 9,478,066 B2 | 10/2016 | Lum et al. |
| 2016/0012157 A1 | 1/2016 | Williams et al. |

OTHER PUBLICATIONS

Feng, et al., "Feature-Preserving Triangular Geometry Images for Level-of-Detail Representation of Static and Skinned Meshes", In Journal of ACM Transactions on Graphics, vol. 29, No. 2, Mar. 2010, pp. 1-12.

Livny, et al., "Seamless Patches for GPU-Based Terrain Rendering", In International Journal of Computer Graphics, vol. 25, Issue 3, Feb. 2009, pp. 201-208.

Rocchini, et al., "Multiple Textures Stitching and Blending on 3D Objects", In Proceedings of 10th Eurographics conference on Rendering, Jun. 21, 1999, 13 pages.

Niski, et al., "Multi-grained Level of Detail for Rendering Complex Meshes Using a Hierarchical Seamless Texture Atlas", In Proceedings of Symposium on Interactive 3D Graphics and Games, Apr. 30, 2007, 8 pages.

* cited by examiner

EDGE WELDING OF GEOMETRIES HAVING DIFFERING RESOLUTIONS

CROSS REFERENCE TO RELATED APPLICATIONS

This application claims priority to U.S. Provisional Application No. 62/503,854 filed May 9, 2017, the entirety of which is hereby incorporated herein by reference.

BACKGROUND

Three-dimensional worlds may be rendered from a plurality of data sources. Visual artifacts that occur during object rendering may detract from a user's experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for rendering a 3D object comprises receiving data for a first 3D object at a first resolution, and receiving data for a second 3D object at a second resolution, lower than the first resolution. Each shared border between the first 3D object and the second 3D object includes one or more shared edges that include corresponding edges of the first and second 3D objects. Relative resolutions are identified for each shared edge of the shared border. An adjusted version of the first 3D object is generated, wherein for at least some shared edges of the shared border, the resolution of the edge of the first 3D object is adjusted to be equal to the corresponding edge of the second 3D object. The adjusted version of the first 3D object is rendered, and the second 3D object is rendered.

DETAILED DESCRIPTION

To efficiently render a three-dimensional world in high fidelity, it is common to use object geometries having differing levels of detail or resolution to compose a scene. When placing a high-resolution object next to a low-resolution object, cracks and seams may be generated, resulting in undesired visual artifacts such as a perceived sparkle and/or the breakthrough appearance of background imagery. Removing such visual artifacts can be an inefficient process for both the central processing unit (CPU) and the graphics processing unit (GPU), and may come with a significant memory cost.

A common method to proactively combat visual artifacts is to construct all geometry on the GPU at runtime from a heightmap. However, this has significant implications on how data is managed and loaded. This is particularly challenging in environments where data chunks could be received in random orders and at random resolutions, such as when streaming data over the web. Numerous problems may be generated if small data chunks are continuously downloaded and pasted into the full data set, including the occurrence of mismatched geometries.

If these problems are targeted using geometry matching, data will have to be reprocessed and regenerated whenever a neighboring geometry part is updated. This can be very costly in terms of CPU processing power, system bus load, and memory. A strictly heightmap based approach cannot efficiently handle object physics. Creating geometry that can be used for physics is beneficial, as it simplifies the rendering pipeline.

A method is described herein whereby two objects of differing geometries are welded together efficiently. A shared boundary between two objects may include a plurality of shared edges. When the two objects are positioned so that at least some vertices are coincident, the corresponding edges from each object may be compared to determine the relative resolutions for each shared edge. Based on the edge resolution comparisons, an adjusted version of the higher resolution object may be retrieved, wherein the resolution of each edge of the higher resolution object matches the resolution of each corresponding edge of the lower resolution object. The adjusted version of the higher resolution object may be precomputed and accessed via an index buffer corresponding to the resolution of the shared boundary. In this way, the objects may be rendered without transferring geometric data between the CPU and GPU, thus realizing a computational savings.

Figure 1:
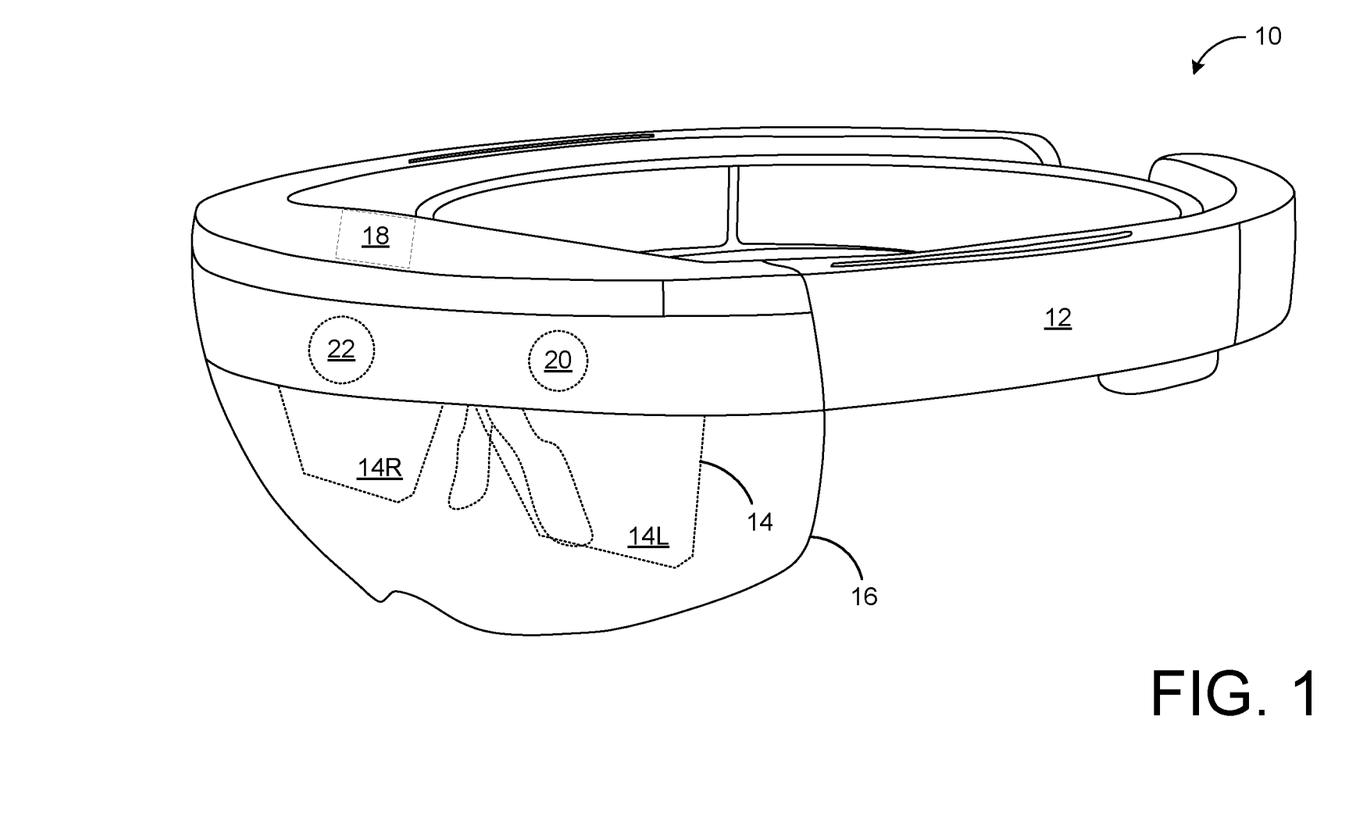
FIG. 1 shows a schematic view of a head-mounted display device according to an example of the present disclosure.

FIG. 1 schematically illustrates an example head-mounted display device 10. Head-mounted display device 10 includes a frame 12 in the form of a band wearable around a head of user that supports see-through display componentry positioned nearby the user's eyes. Head-mounted display device 10 may use augmented reality technologies to enable simultaneous viewing of virtual display imagery and a real-world background. As such, head-mounted display device 10 may generate virtual images via see-through display 14, which includes separate right and left eye displays 14R and 14L, and which may be wholly or partially transparent. See-through display 14 may take any suitable form, such as a waveguide or prism configured to receive a generated image and direct the image towards a wearer's eye.

See-through display 14 may include a backlight and a microdisplay, such as liquid-crystal display (LCD) or liquid crystal on silicon (LCOS) display, in combination with one or more light-emitting diodes (LEDs), laser diodes, and/or other light sources. In other examples, see-through display 14 may utilize quantum-dot display technologies, active-matrix organic LED (OLED) technology, and/or any other suitable display technologies. It will be understood that while shown in FIG. 1 as a flat display surface with left and right eye displays, see-through display 14 may be a single display, may be curved, or may take any other suitable form.

Head-mounted display device 10 further includes an additional see-through optical component 16, shown in FIG. 1 in the form of a see-through veil positioned between see-through display 14 and the real-world environment as viewed by a wearer. A controller 18 is operatively coupled to see-through optical component 16 and to other display componentry. Controller 18 includes one or more logic devices and one or more computer memory devices storing instructions executable by the logic device(s) to enact functionalities of head-mounted display device 10. Head-mounted display device 10 may further include various other components, for example a two-dimensional image camera 20 (e.g. a visible light camera and/or infrared camera) and a depth imaging device 22, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Figure 2:
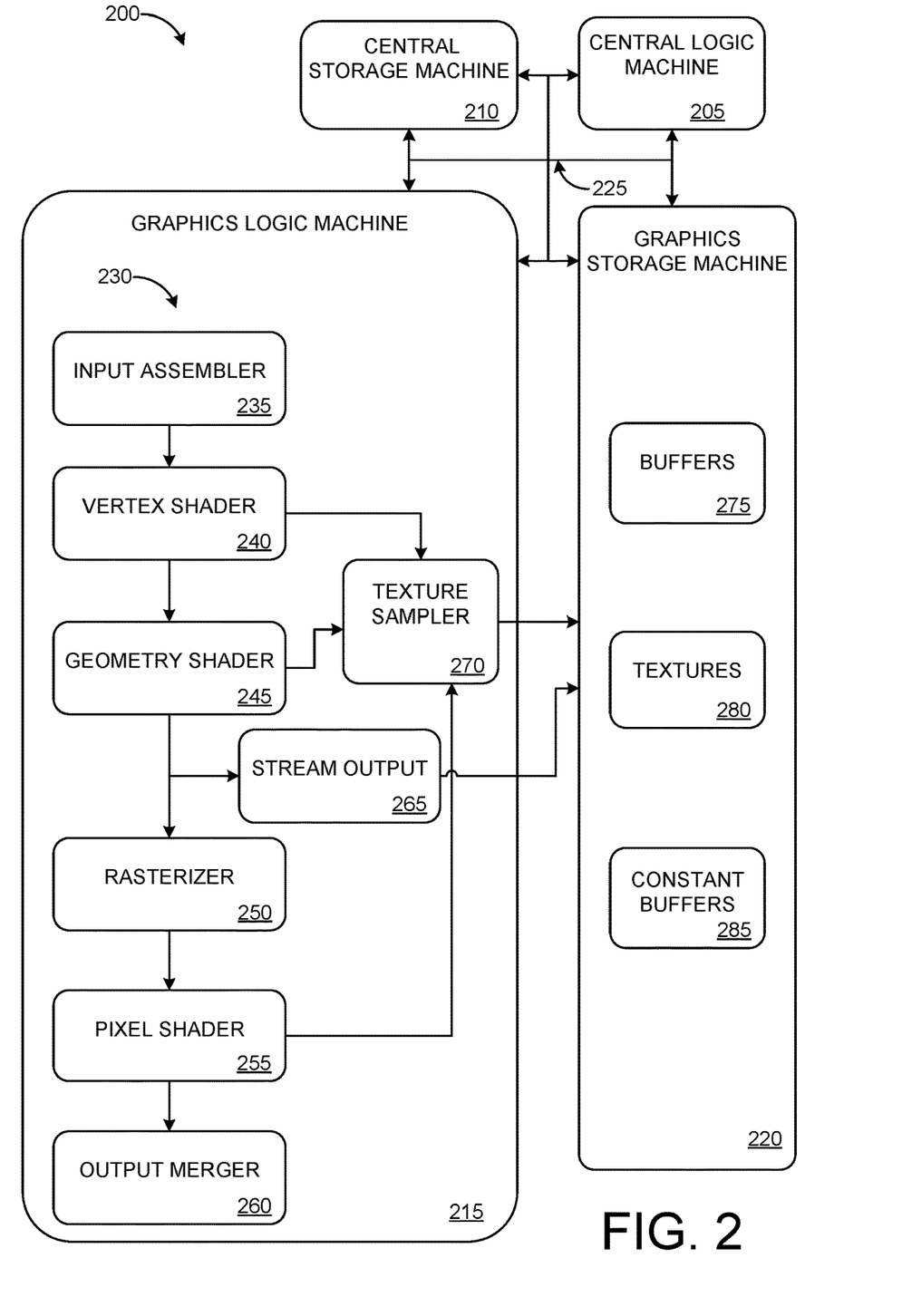
FIG. 2 schematically shows a computing device including a graphics pipeline usable for transforming data into images for presentation on a display.

FIG. 2 schematically shows an example computing system 200. Computing system 200 may be an example of controller 18. Computing system 200 may include one or more central logic machines 205, e.g., a central processing unit (CPU). Central logic machine 205 may function to perform various types of data processing for computing system 200. Central storage machine 210 may be configured to store data and/or instructions for processing by central logic machine 205. Computing system 200 may further include graphics logic machine 215 and graphics storage machine 220. Graphics logic machine 215 may function to perform various graphics related tasks for computing system 200. Graphics logic machine 215, for example, may represent a graphics processing unit (GPU) for head-mounted display device 10.

One or more busses 225 may directly or indirectly couple central logic machine 205, central storage machine 210, graphics logic machine 215, and graphics storage machine 220. For example, bus 225 may represent a data bus, and address bus, and/or a combination thereof. Bus 225 may additionally or alternatively couple computing system 200 to one or more input/output (I/O) ports and/or components.

Graphics logic machine 215 may be coupled to a video encoder/video codec (coder/decoder) to form a graphics processing pipeline for high speed and high-resolution graphics processing. Bus 225 may facilitate transfer of data between graphics logic machine 215 and the video encoder/video codec. Outputs of the graphics processing pipeline may be output to an audio/video (A/V) port for transmission to a display, such as see-through display 14 and/or other displays. For example, graphics logic machine 215 and graphics storage machine 220 may be components of a graphics card for head-mounted display device 10, and may be capable of presenting holographic, three-dimensional (3D) graphics on see-through display 14.

A 3D object is typically constructed out of a plurality of polygons, with each corner of a polygon defining a vertex. Each polygon may be a triangle and thus include three vertices. The collection of polygons that make up a 3D object may be commonly known as a mesh or geometric mesh. Before a given mesh can be displayed on see-through display 14, it may first be converted into an array of colored dots, commonly known as pixels. Graphics logic machine 215 and graphics storage machine 220 may be configured to allow changing and/or modification of the appearance of meshes. For example, a mesh may be animated, colored, shaded, etc. A collection of programs used to make these changes may be known as a graphics pipeline.

The graphics pipeline may include one or more shaders. Shaders may operate on either the pixels making up the 3D mesh before display, or directly on the vertices themselves. Shaders may operate on both the vertex and pixel data simultaneously. Vertex shaders may modify the position of an object or mesh either through a transform or an animation, for example. Pixel shaders may adjust the appearance of an object or mesh such as an object's color and/or the way in which the object is lit, for example. A mesh processed by one or more shaders may be written to memory, where it can be accessed and rendered for display on a display device.

FIG. 2 schematically depicts an exemplary graphics pipeline 230 may be performed at a graphics processing unit, such as graphics logic machine 215. Graphics pipeline 230 includes a plurality of stages for transforming data into images to be displayed on a display device, such as see-through display 14. Graphics pipeline 230 includes input assembler 235, vertex shader 240, geometry shader 245, rasterizer 250, pixel shader 255, and output merger 260. Graphics pipeline may further include stream output stage 265 and texture sampler 270. Stream output stage 265 and texture sampler 270 may be configured to facilitate communication between graphics pipeline 230 and graphics storage machine 220. It will be appreciated that graphics pipeline 230, as depicted in FIG. 2 is exemplary, and additional components may be added or components removed.

Graphics pipeline 230 includes both fixed function and programmable stages. Fixed function stages may include, but are not limited to, input assembler 235, rasterizer 250, output merger 260, and texture sampler 270. Programmable graphics stages include vertex shader 240, geometry shader 245, and pixel shader 255.

Input data for graphics pipeline 230 may include one or more models, each model including a plurality of vertices that create a mesh of triangles. Input assembler 235 may receive the one or more models and may read vertices out of memory using fixed function operations and/or forms geometry. Input assembler may then create pipeline work items and supply work item data (e.g., triangles, lines, and points) to graphics pipeline 230. The work item data may include data indicating the position of vertices, and/or other data related to a 3D mesh. The work item data may be read from graphics storage machine 220, for example. However, the stream data may also be read from central storage machine 210. Shaders 240, 245, and 255 may be executed at graphics logic machine 215 on work item data.

Work item data may be passed from input assembler 235 to vertex shader 240. Vertex shader 240 may be a graphics processing function that may be used to add special effects to objects in a 3D environment by performing mathematical operations on the objects' vertex data. Vertex shader 240 may process vertices within the work item data, performing per-vertex operations such as transformations, skinning, morphing, and per-vertex lighting. Vertex shader 240 may take a single input vertex and produce a single output vertex. If no vertex modification or transformation is required, a pass-through vertex shader may be created and deployed within graphics pipeline 230. Vertex shader 240 may be run on all input vertices, including adjacent vertices in input primitive topologies with adjacency.

Each vertex manipulation may be coordinated, such as in projecting an object for the correct perspective from a given user's viewpoint. Vertex shader 240 may retrieve additional data from graphics storage machine 220, such as data stored in one or more buffers 275, one or more textures 280, and one or more constant buffers 285. For example, each buffer 275 may include a collection of elements (e.g., raw data). A vertex buffer may contain per-vertex data. A simple vertex buffer may contain one type of data, such as position data. In some examples, a vertex buffer could contain per-vertex position, normal and texture coordinates.

An index buffer may contain a sequential set of indices, such as 16-bit or 32-bit indices, though larger or smaller indices may additionally or alternatively be used. Each index may be used to identify a vertex in a vertex buffer. An index buffer may be configured to stitch together multiple line or triangle strips, and thus be utilized to draw multiple line or triangle strips with a single draw call.

Geometry shader 245 may generate new graphics primitives, such as points, lines, and triangles, from those primitives that were sent to the beginning of the graphics pipeline. Geometry shader 245 may run application-specified shader code with vertices as input and the ability to generate vertices as output. Geometry shader 245 may stage process entire primitives. The geometry shader input may be a full primitive (e.g., three vertices for a triangle, two vertices for a line, or a single vertex for a point). In addition, each primitive may also include the vertex data for any edge-adjacent primitives. This additional data may include up to an additional three vertices for a triangle or an additional two vertices for a line. Geometry shader 245 may also support limited geometry amplification and de-amplification.

Given an input primitive, geometry shader 245 may discard the primitive, and/or emit one or more new primitives. Geometry shader 245 may be configured to output multiple vertices forming a single selected topology. Geometry shader output may be fed to rasterizer 250 and/or to a buffer 275 in graphics storage machine 220 via stream output stage 265. Output fed to graphics storage machine 220 may be expanded to individual point/line/triangle lists (e.g., as they would otherwise be passed to the rasterizer). Constant buffers 285 may be configured to supply geometry shader 245 with shader constants. Constant buffers 285 thus reduce the bandwidth required to update shader constants by allowing shader constants to be grouped together and committed at the same time rather than making individual calls to commit each constant separately.

Stream output stage 265 may be configured for streaming primitive data from graphics pipeline 230 to graphics storage machine 220 on its way to rasterizer 250. Data may be streamed out and/or passed into rasterizer 250. Data streamed out to graphics storage machine 220 may be recirculated back into graphics pipeline 230 as input data or may be read-back by central logic machine 205. Stream output stage 265 may allow for the continuous output (or streaming) of vertex data from geometry shader 245 (or from vertex shader 240 if geometry shader 245 is inactive) to one or more constant buffers 285 in graphics storage machine 220.

Rasterizer 250 may convert vector information (composed of shapes or primitives) into a raster image (composed of pixels) for the purpose of displaying 3D graphics. Rasterization may include clipping vertices to a view frustum, performing a perspective divide to transform the points into homogeneous space, mapping primitives to a 2D viewport, and/or determining how to invoke pixel shader 255. During rasterization, each primitive is converted into pixels, while interpolating per-vertex values across each primitive. Rasterization clipping may include clipping the edges of one polygon that lies outside of another polygon.

Pixel shader 255 may serve to manipulate a pixel color, such as to apply an effect on an image, for example; realism, bump mapping, shadows, and explosion effects, enabling rich shading techniques such as per-pixel lighting and post-processing. Pixel shader 255 may be a graphics function that calculates effects on a per-pixel basis. Pixel shader 255 may receive interpolated data for a primitive and may generate per-pixel data such as color. Input data to pixel shader 255 may include vertex attributes or may be treated as per-primitive constants. Rasterizer 250 may invoke pixel shader 255 once for each pixel covered by a primitive, however, it is possible to specify a NULL shader to avoid running pixel shader 255 for a particular pixel. Input data to pixel shader 255 may be interpolated from the vertex attributes of the primitive being rasterized based on the declared interpolation mode. If a primitive gets clipped before rasterization, the interpolation mode may be honored during the clipping process as well.

Texture sampler 270 may be utilized by vertex shader 240, geometry shader 245 and pixel shader 255 to fetch data from graphics storage machine 220. Texture sampler 270 may perform texture filtering operations and texture addressing modes, and may convert data between different formats. Texture sampler 270 may define how textures 280 are sampled and filtered. Each texture 280 may be a structured collection of data indicating texels (texture elements). A texel may represent the smallest unit of a texture that can be read or written to by graphics pipeline 230. Textures 280 may be filtered by texture sampler 270 as they are read by shader units 240, 245, and 255.

Output merger 260 may be a fixed function and may perform operations such as blend, depth and stencil. Output merger 260 may be responsible for combining various types of output data (e.g., pixel shader values, depth, and stencil information) with the contents of the render target and depth/stencil buffers to generate the final pipeline result.

Figure 3:
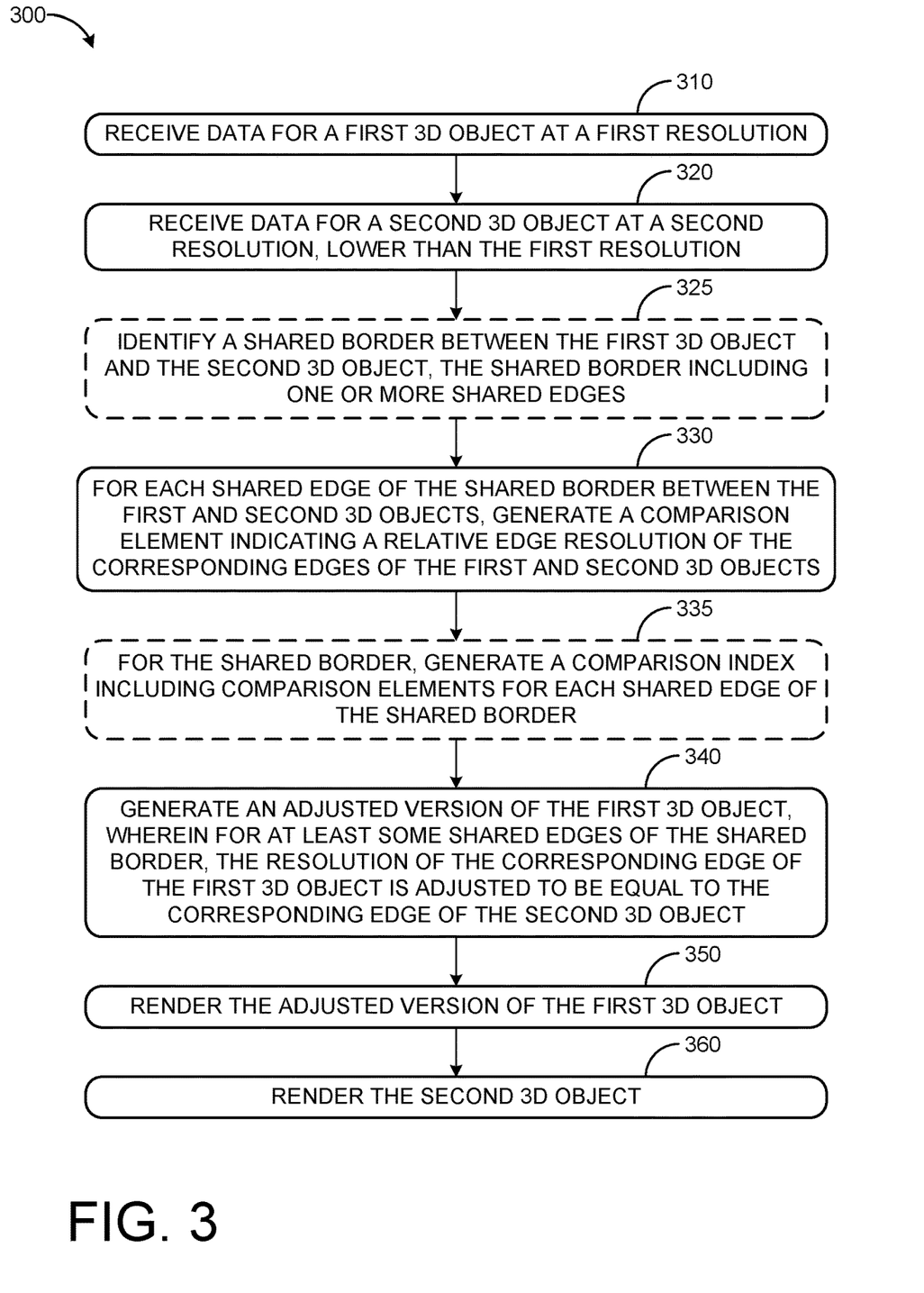
FIG. 3 shows a flow chart for a high-level method for rendering edges shared between objects of differing resolutions.

To render multiple adjacent objects having differing resolutions, a method is presented that efficiently evaluates the shared border between the objects, determines any mismatched edges at the shared border, then removes any excess vertices of the higher resolution object and seamlessly welds the two objects together. Such a method reduces visual artifacts occurring at the intersection of objects having different resolutions without requiring the entire geometric data for either object to be reloaded onto the graphics storage machine from the central storage machine, thus FIG. 3 shows a flow chart for a high-level method 300 for rendering a 3D object. Specifically, method 300 may enable the rendering of edges shared between 3D objects of differing resolutions. Method 300 may be used as an efficient way of seamlessly stitching together objects of different resolutions without altering or reloading the raw geometry data for each object.

At 310, method 300 includes receiving data for a first 3D object at a first resolution. The data for the first 3D object may be received at and/or loaded into the graphics storage machine of a display device from the central logic machine of the same display device, from a central logic machine for a different computing device, via a communication device (e.g., over the internet), etc. In some examples, data for the first 3D object may have been previously stored at the graphics storage machine and recalled upon receiving a prompt.

At 320, method 300 includes receiving data for a second 3D object at a second resolution, lower than the first resolution. As with the data for the first 3D object, the data may be received from a local device, a remote device, via a communication device, and/or may be previously stored at the graphics storage machine.

The data received for each of the first and second 3D objects may include a plurality of vertices and may further include a geometric mesh that includes a plurality of edges that connect two or more vertices. For example, a plurality of vertices may be used to generate a plurality of edges and polygons (e.g., triangles). In some examples, the data for the first 3D object and the second 3D object may include coordinate locations on a heightmap for each plurality of vertices.

At 325, method 300 optionally includes identifying a shared border between the first 3D object and the second 3D object, the shared border including one or more shared edges. For each shared border of the first and second 3D objects, shared edges and vertices may be identified. For example, data received for the second 3D object may indicate that two or more vertices of the second 3D object coincide with two or more vertices of the first 3D object. For examples where heightmaps are used to plot all vertices for a scene, some vertices may be coincident, as the objects are generated out of a common set of data points. In some examples, a first geometry may be generated from the data for the first 3D object, and a second geometry for the second 3D object may be generated utilizing the vertexes and/or edges for the first 3D object as a reference.

Method 300 may additionally or alternatively include aligning the shared border of the first 3D object and the second 3D object so that two or more border vertices of the first 3D object and the second 3D object are coincident. As an example, data may be received for the second 3D object indicating that two or more vertices of the second 3D object are within a threshold distance of, but not coincident with, two or more vertices of the first 3D object. The position of two or more vertices of the first and second 3D objects may then be adjusted to generate two or more coincident vertices between the first and second 3D objects (i.e., snapped together).

In some examples, the positions of a vertex of the first 3D object and a vertex of the second 3D object that is within a threshold distance of the vertex of the first 3D object may be averaged to generate a common vertex between the first and second 3D objects. The position of the vertex from the first 3D object may be adjusted to the averaged position, and the position of the vertex from the second 3D object may also be adjusted to the averaged position.

If the scene layout is free-form (e.g., no heightmap), the first and second 3D objects may be run through a patch and snapped together, provided the shared data points are within a threshold of matching. In such examples, the position of two or more vertices of one of the first and second 3D objects may be maintained, and the position of two or more vertices of the other of the first and second 3D objects may be adjusted to coincide with the maintained vertices.

At 330, method 300 includes, for each shared edge of a shared border between the first and second 3D objects, generating a comparative element indicating a relative edge resolution of the corresponding edges of the first and second 3D objects. For example, it may be determined whether an edge resolution is higher for a corresponding edge of the first 3D object than for the corresponding edge of the second 3D object.

In some examples, the first and second 3D objects may be initially aligned such that for a shared border, every vertex on an edge of the second 3D object matches up to a vertex along a shared edge of the first 3D object. If the first and second 3D objects have the same resolution along the shared border, then each vertex may be rendered for each edge of the shared border. For examples where the second 3D object has a lower resolution, vertices may need to be removed from the first 3D object along shared edges, effectively reducing the resolution of the first 3D object at the shared edge. In this way, the geometry for the first 3D object may be constructed such that a subset of its initial vertices along a shared edge are coincident with the vertices of the second, lower resolution 3D object along the shared edge.

Figure 4A:
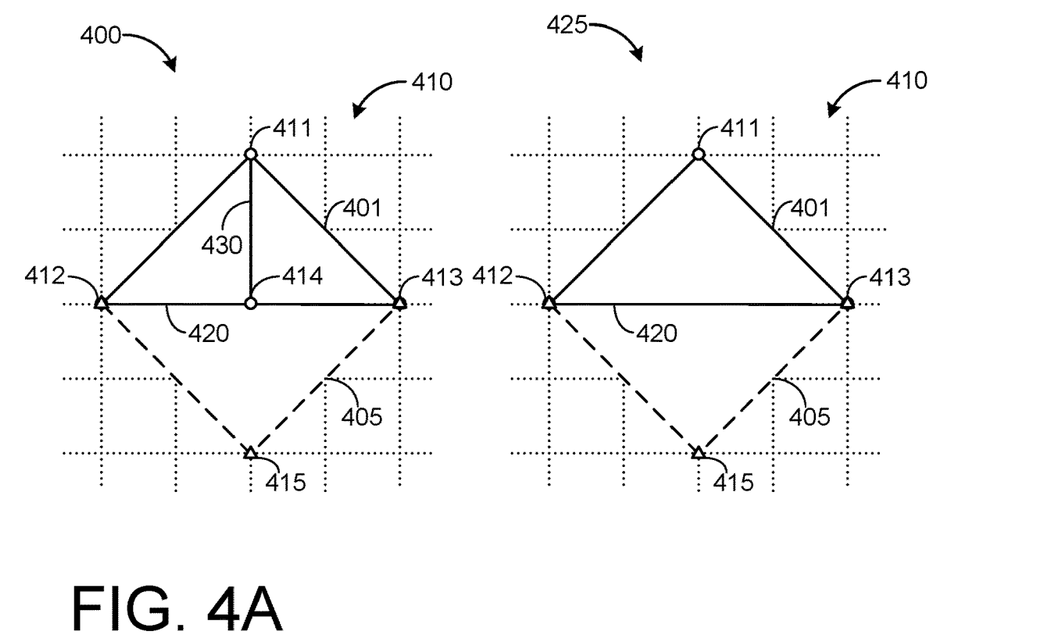
FIGS. 4A and 4B schematically show examples of edge-welding between two objects sharing a single edge.

FIGS. 4A and 4B illustrate examples of edge resolution comparison and edge-welding between two objects sharing a single edge. At 400, FIG. 4A shows a first example object 401 and a second example object 405 oriented on heightmap 410. First example object 401 is depicted with solid lines and circular vertices, while second example object 405 is depicted with dashed lines and triangular vertices. First example object 401 includes vertices 411, 412, 413, and 414. Second example object 405 includes vertices 412, 413, and 415. Vertices 412 and 413 are shared between objects 401 and 405, yielding shared edge 420. First example object 401 is a higher resolution object, including an additional vertex (414) along shared edge 420. At 425, first example object 401 is shown with vertex 414 removed. As such, shared edge 420 is now seamless, with each corresponding edge having the same resolution. Further, edge 430, extending from vertex 411 to vertex 414 is removed, and the geometry of first example object 401 adjusted.

Figure 4B:
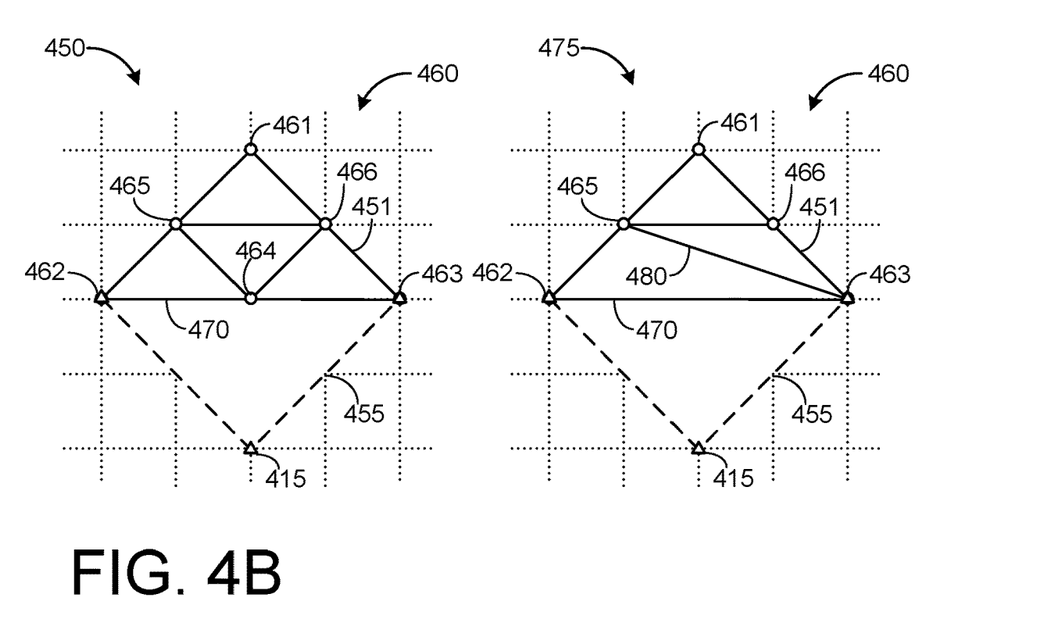

At 450, FIG. 4B shows a first example object 451 and a second example object 455 oriented on heightmap 460. First example object 451 includes vertices 461, 462, 463, 464, 465, and 466. Second example object 455 includes vertices 462, 463, and 467. Vertices 462 and 463 are shared between objects 451 and 455, generating shared edge 470. First example object 451 is a higher resolution object, including an additional vertex (464) along shared edge 470. At 475, first example object 451 is shown with vertex 464 removed. As such, shared edge 470 is now seamless, with each corresponding edge having the same resolution. Further, the removal of vertex 464 causes the geometry of first example object 451 to be adjusted, with the removal of two edges and the generation of new edge 480, extending between vertexes 463 and 465. As such, the adjusting of vertices along shared edges may impact how edge-adjacent edges and polygons are rendered.

At 335, method 300 optionally includes, for each shared border, generating a comparative index including comparative elements for each shared edge of the shared border. For example, identifying relative resolutions for corresponding edges of the first and second 3D objects may include performing a bitwise-OR operation on each shared edge of the shared border. The bitwise-OR operation may indicate whether the corresponding edge of the first 3D object has a higher resolution than the corresponding shared edge of the second 3D object. Such a comparative index may then be used to determine which vertices for the higher resolution 3D object are to be rendered.

In some examples, the generated comparative index is used to call a pre-determined index buffer for the first 3D object, the pre-determined index buffer stored at the graphics storage machine. The called index buffer may correspond to a version of the first 3D object having an edge resolution equal to the edge resolution of the second 3D object. As an example, a 3D object may include one or more regions that are likely to interface with a lower resolution 3D object, thus creating a shared border. For each potential shared border, a set of index buffers may be pre-determined, and loaded into the graphics storage machine. The set of index buffers may collectively indicate all possible permutations for that shared border interfacing with a lower resolution 3D object.

The raw geometry for a 3D object may include a list of vertices. Index buffers are used to point at the raw vertex data, indicating to the renderer what vertices to use when constructing the mesh for the 3D object. Different index buffers can be used for pointing at different subsets of the vertex data. In this way, numerous different visual geometries may be created for a 3D object without altering the vertex data. For example, an index buffer can be constructed that includes all the vertices for when a first object is sharing a border with a second object of the same resolution. For a border shared with a lower resolution object, a comparative index may be created based on only the identical vertices along an edge, skipping any unique vertices. An index buffer indicating the identical vertices may then be called.

A set of index buffers may be pre-computed depending on the number of permutations of shared borders and shared edges. Such index buffers may be stored so that the state of each border may be determined bit-wise, each bit strung together into an index. From the perspective of the first, higher resolution 3D object, the resolution of each shared edge may be indicated relative to the lower resolution object. Once the edge corrections are determined, they may be called from the index buffer.

As an example, the resolution for each shared edge may be indicated to be the same or higher than the corresponding lower resolution edge. Thus, a bitwise-OR operation may be used to indicate edge corrections. By looking at all the shared edges, and knowing that there are two possible configurations for each edge, the number of variations of the mesh that may be required can be pre-computed for a putative shared border. At run time, each shared border can be tested, and one comparative index generated. The index buffer (or mask) may then be requested that indicates how the mesh should be rendered. In examples where each shared edge has two variations (e.g., 0=same/lower, 1=higher), 16 index buffers may be required for a 4-bit edge.

At runtime, the relative resolutions of each shared edge may be compared, and a comparative index created by bitwise-OR-ing the relative resolutions at each shared edge of a shared border. The pre-computed index buffer may be called based on the comparative index, and the objects may be rendered without changing any of the data associated with the raw vertex geometry. In this way, processing resources may be conserved, as the bulk of the object data is stored within the vertices, whereas index buffers have a relatively small memory footprint. The original vertex geometry may be stored within the graphics storage machine, rather than being reprocessed at the central processor and re-transferred to the graphics processor. Index buffers may be shared for objects having the same layouts, etc. Index buffers are generally computed at load time, but may be re-computed if memory savings are needed.

Although generally described herein as a bit-wise implementation that can indicate differences of one level of detail, in other examples, multiple levels of detail may be achieved. For example, each edge relationship may be described with multiple bits, allowing for additional granularity. This may generate a larger mask, and a larger number of index buffers. However, the footprint may be maintained to be relatively small if the index buffers can be shared. As such, an edge comparison may indicate varying degrees of resolution difference (e.g., 100%, 75%, 50%, 25%).

At 340, method 300 includes generating an adjusted version of the 3D object, wherein for at least some shared edges of the shared border, the resolution of the corresponding edge of the first 3D object is adjusted to be equal to the resolution of the corresponding edge of the second 3D object. The adjusted version of the 3D object may be determined based on vertices indicated by the comparative index and/or one or more pre-determined index buffers. As an example, a subset of vertices may be retrieved from the graphics storage machine for the first 3D object based on a generated comparative index.

Figure 5A:
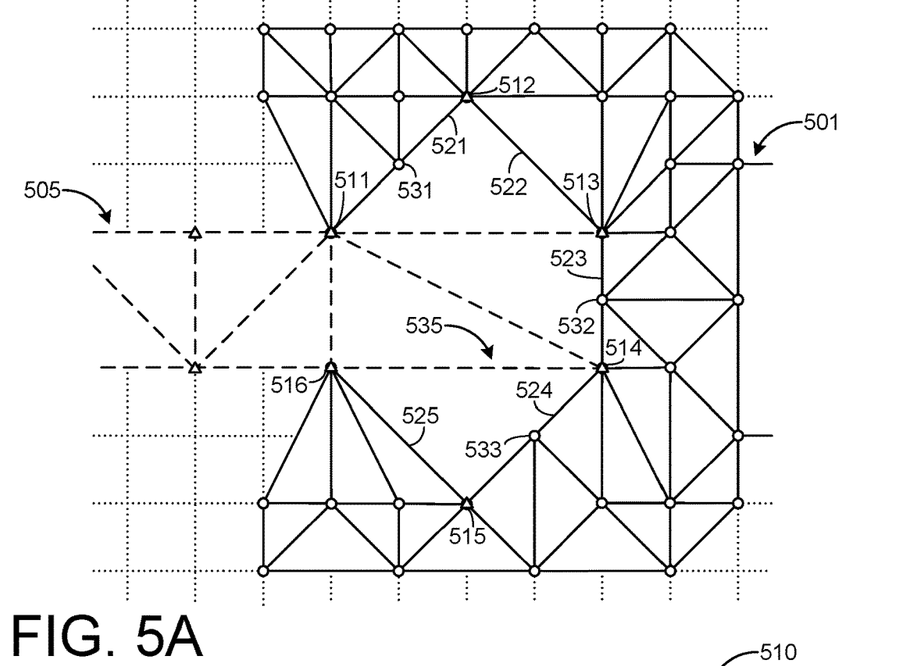
FIGS. 5A and 5B schematically show an example of edge-welding between two objects sharing a border including multiple shared edges.

FIGS. 5A and 5B illustrate an example of edge resolution comparison and edge-welding between two objects sharing multiple edges. FIG. 5A shows a first example object 501 and a second example object 505 oriented on heightmap 510. First example object 501 is depicted with solid lines and circular vertices, while second example object 505 is depicted with dashed lines and triangular vertices. First example object 501 and second example object 505 share vertices 511, 512, 513, 514, 515, and 516. First example object 501 and second example object 505 share edges 521, 522, 523, 524, and 525. First example object 501 is a higher resolution object, including additional vertices 531, 532, and 533 along shared edges 521, 523, and 524. Shared edges 521, 522, 523, 524, and 525 are contiguous, forming a shared border 535 between first example object 501 and second example object 505.

Figure 5B:
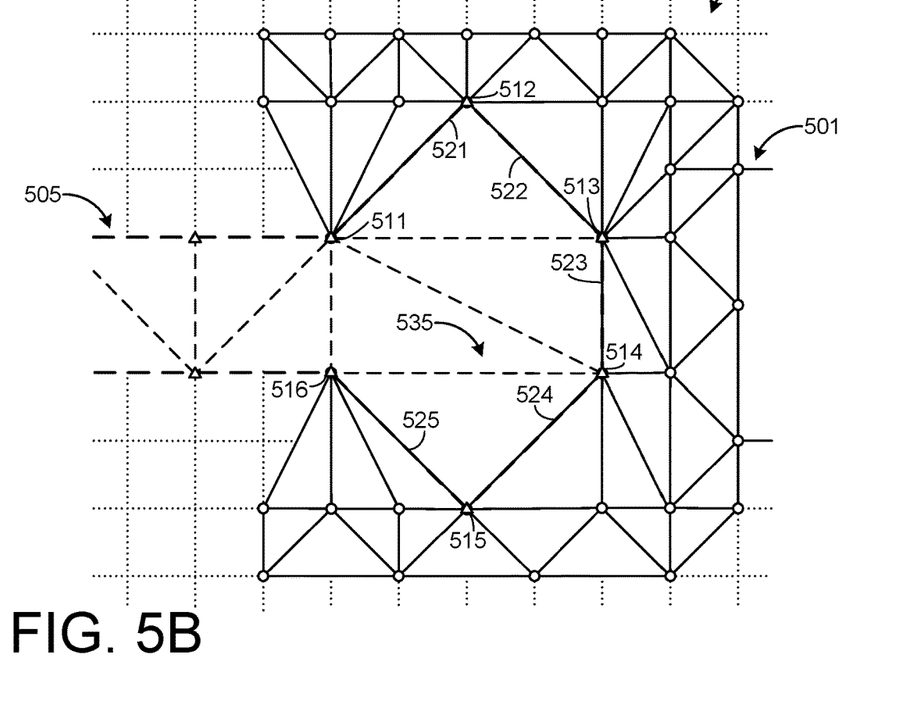

A comparative index may be generated for shared border 535, for example {10110}, where a 1 is indicated for each edge where first example object 501 has a higher resolution than second example object 505, and a 0 is indicated for each edge where the resolutions are the same. FIG. 5B shows first example object 501 and second example object 505 where additional vertices 531, 532, and 533 are removed, and where edges and triangles within the geometry for first example object 501 are adjusted based on the reduced number of vertices rendered.

Returning to FIG. 3, at 350, method 300 includes rendering the adjusted version of the first 3D object. Rendering the first 3D object may be based on the retrieved subset of vertices indicated via an index buffer. As described with regard to FIGS. 5A and 5B, rendering the adjusted version of the first 3D object may include adjusting one or more edges of the geometric mesh for the first 3D object. For example, where the geometric mesh is a triangular mesh, rendering the adjusted version of the first 3D object may include adjusting one or more triangles of the geometric mesh for the first 3D object. At 360, method 300 includes rendering the second 3D object. In some examples, the second 3D object may be rendered as received. However, if one or more vertices of the second 3D object are adjusted to align with vertices of the first 3D object, an adjusted version of the second 3D object may be rendered.

The first and second 3D objects may thus be rendered to have seamless geometry despite the lower resolution of the second 3D object. Further, this method allows for better rendering performance at minimal CPU and memory cost by updating the edge relationships, and by taking advantage of the GPU having already parsed the expensive vertex data via the use of predetermined index buffers. Further, visual artifacts may be reduced, and more realistic collisions may be produced, particularly for virtual-reality and/or mixed-reality applications.

Although described with regard to heightmap data where vertices are restricted to certain locations, the method may also be applied to less rigid platforms. However, two non-perfectly matched pieces of geometry may yield visible sparkles at mismatched vertices or edges. A tolerance may be set for a total number of mismatches (i.e., 0.1% or lower, depending on background). Weld geometry problems, such as object collisions may additionally or alternatively be set to have an increased tolerance.

In some examples, vertex removal may be done iteratively, with a subset of vertices removed following each comparison, followed by another comparison and round of vertex removal. In some scenarios, an object may share a border with objects of both higher and lower resolution. In such a scenario, multiple bit-wise comparisons may happen simultaneously, and each index buffer called may be dependent on two or more such comparisons.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
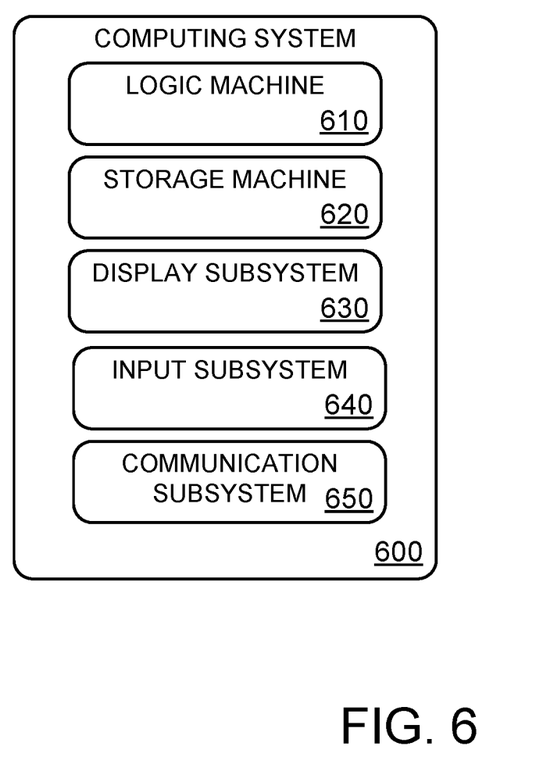
FIG. 6 shows a block diagram of an example computing device.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 610 and a storage machine 620. Computing system 600 may optionally include a display subsystem 630, input subsystem 640, communication subsystem 650, and/or other components not shown in FIG. 6.

Logic machine 610 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 620 includes one or more physical devices configured to hold instructions executable by the logic machine to implement the methods and processes described herein. When such methods and processes are implemented, the state of storage machine 620 may be transformed—e.g., to hold different data.

Storage machine 620 may include removable and/or built-in devices. Storage machine 620 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 620 may include volatile, nonvolatile, dynamic, static, read/write, read-only, random-access, sequential-access, location-addressable, file-addressable, and/or content-addressable devices.

It will be appreciated that storage machine 620 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 610 and storage machine 620 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 610 executing instructions held by storage machine 620. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 630 may be used to present a visual representation of data held by storage machine 620. This visual representation may take the form of a graphical user interface (GUI). As the herein described methods and processes change the data held by the storage machine, and thus transform the state of the storage machine, the state of display subsystem 630 may likewise be transformed to visually represent changes in the underlying data. Display subsystem 630 may include one or more display devices utilizing virtually any type of technology. Such display devices may be combined with logic machine 610 and/or storage machine 620 in a shared enclosure, or such display devices may be peripheral display devices.

When included, input subsystem 640 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 650 may be configured to communicatively couple computing system 600 with one or more other computing devices. Communication subsystem 650 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In one example, a method for rendering a 3D object comprises receiving data for a first 3D object at a first resolution; receiving data for a second 3D object at a second resolution, lower than the first resolution; for each shared border between the first 3D object and the second 3D object, identifying, for each shared edge of the shared border, relative resolutions for corresponding edges of the first and second 3D objects forming that shared edge; generating an adjusted version of the first 3D object, wherein for at least some shared edges of the shared border, the resolution of the corresponding edge of the first 3D object is adjusted to be equal to the resolution of the corresponding edge of the second 3D object; rendering the adjusted version of the first 3D object; and rendering the second 3D object. In such an example, or any other example, the data received for each of the first and second 3D objects may additionally or alternatively include: a plurality of vertices; and a geometric mesh that includes a plurality of edges that connect two or more vertices. In any of the preceding examples, or any other example, the data received for the first 3D object and the second 3D object may additionally or alternatively include coordinate locations on a heightmap for each plurality of vertices. In any of the preceding examples, or any other example, receiving data for a second 3D object may additionally or alternatively include: receiving data for the second 3D object indicating that two or more vertices of the second 3D object coincide with two or more vertices of the first 3D object. In any of the preceding examples, or any other example, receiving data for a second 3D object may additionally or alternatively include: receiving data for the second 3D object indicating that two or more vertices of the second 3D object are within a threshold distance of, but not coincident with, two or more vertices of the first 3D object; and adjusting the position of two or more vertices of the first and second 3D objects to generate two or more coincident vertices between the first and second 3D objects. In any of the preceding examples, or any other example, adjusting the position of two or more vertices of the first and second 3D objects to generate two or more coincident vertices between the first and second 3D objects may additionally or alternatively include averaging the positions of a vertex of the first 3D object and a vertex of the second 3D object that is within a threshold distance of the vertex of the first 3D object; adjusting the position of the vertex from the first 3D object to the averaged position; and adjusting the position of the vertex from the second 3D object to the averaged position. In any of the preceding examples, or any other example, adjusting the position of two or more vertices of the first and second 3D objects to generate two or more coincident vertices between the first and second 3D objects may additionally or alternatively include: maintaining the position of two or more vertices of one of the first and second 3D objects; and adjusting the position of two or more vertices of the other of the first and second 3D objects to coincide with the maintained vertices. In any of the preceding examples, or any other example, identifying relative resolutions for corresponding edges of the first and second 3D objects may additionally or alternatively include performing a bitwise-OR operation on each shared edge of the shared border. In any of the preceding examples, or any other example, rendering the adjusted version of the first 3D object may additionally or alternatively include adjusting one or more edges of the geometric mesh for the first 3D object. In any of the preceding examples, or any other example, the geometric mesh may additionally or alternatively be a triangular mesh, and rendering the adjusted version of the first 3D object may additionally or alternatively include adjusting one or more triangles of the geometric mesh for the first 3D object.

In another example, a method for rendering a 3D object, comprises loading data into a graphics storage machine for a first 3D object at a first resolution, the data including a geometric mesh that includes plurality of vertices and a plurality of edges connecting two or more vertices; receiving data for a second 3D object at a second resolution, lower than the first resolution, the data for the second 3D object including a geometric mesh that includes a plurality of vertices and a plurality of edges connecting two or more vertices, the second 3D object sharing a border with the first 3D object, the shared border including one or more shared edges; for each shared edge of the shared border between the first 3D object and the second 3D object, generating a comparative element indicating a relative edge resolution of the corresponding edges of the first 3D object and the second 3D object; for the shared border, generating a comparative index including comparative elements for each shared edge of the shared border; retrieving a subset of vertices from the graphics storage machine for the first 3D object based on the generated comparative index; rendering the first 3D object based on the retrieved subset of vertices; and rendering the second 3D object. In such an example, or any other example, the data for the first 3D object and the second 3D object may additionally or alternatively include coordinate locations on a heightmap for each plurality of vertices. In any of the preceding examples, or any other example, the shared border may additionally or alternatively include two or more vertices that are coincident between the first 3D object and the second 3D object. In any of the preceding examples, or any other example, the method may additionally or alternatively comprise aligning the shared border of the first 3D object and the second 3D object so that two or more border vertices of the first 3D object and the second 3D object are coincident. In any of the preceding examples, or any other example, generating a comparative index indicating a relative edge resolution may additionally or alternatively include performing a bitwise-OR operation on each shared edge of the shared border. In any of the preceding examples, or any other example, the bitwise-OR operation may additionally or alternatively indicate whether the corresponding edge of the first 3D object has a higher resolution than the corresponding shared edge of the second 3D object. In any of the preceding examples, or any other example, rendering the first 3D object based on the retrieved subset of vertices may additionally or alternatively include rendering an adjusted geometric mesh for the first 3D object based on the retrieved vertices. In any of the preceding examples, or any other example, the comparative index may additionally or alternatively be used to call a pre-determined index buffer for the first 3D object, the pre-determined index buffer stored at the graphics storage machine.

In yet another example, a computing system, comprises a central logic machine; a central storage machine; a graphics logic machine; and a graphics storage machine holding instructions executable by the graphics logic machine to: at the graphics storage machine, receive data for a first 3D object at a first resolution; at the graphics storage machine, receive data for a second 3D object at a second resolution, lower than the first resolution; for each shared border between the first 3D object and the second 3D object, identify, for each shared edge of the shared border, relative resolutions for corresponding edges of the first and second 3D objects forming that shared edge; generate an adjusted version of the first 3D object based on data stored at the graphics storage machine, wherein for at least some shared edges of the shared border, the resolution of the corresponding edge of the first 3D object is adjusted to be equal to the resolution of the corresponding edge of the second 3D object; render the adjusted version of the first 3D object; and render the second 3D object. In such an example, or any other example, the graphics storage machine may additionally or alternatively hold instructions executable by the graphics logic machine to: for the shared border, generating a comparative index indicating relative resolutions for each shared edge of the shared border; and retrieving a subset of vertices from the graphics storage machine for the first 3D object based on the generated comparative index.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for rendering a 3D object, comprising:
receiving data for a first 3D object at a first resolution;
receiving data for a second 3D object at a second resolution, different than the first resolution;
for each shared border between the first 3D object and the second 3D object, identifying, for each shared edge of the shared border, relative resolutions for corresponding edges of the first and second 3D objects forming that shared edge based on performing a bitwise-OR operation on each shared edge of the shared border;
generating an adjusted version of the first 3D object, wherein for at least some shared edges of the shared border, the resolution of the corresponding edge of the first 3D object is adjusted to be equal to the resolution of the corresponding edge of the second 3D object;
rendering the adjusted version of the first 3D object; and
rendering the second 3D object.

2. The method of claim 1, wherein the data received for each of the first and second 3D objects includes:
a plurality of vertices; and
a geometric mesh that includes a plurality of edges that connect two or more vertices.

3. The method of claim 2, wherein the data received for the first 3D object and the second 3D object includes coordinate locations on a heightmap for each plurality of vertices.

4. The method of claim 3, wherein receiving data for a second 3D object further includes:
receiving data for the second 3D object indicating that two or more vertices of the second 3D object coincide with two or more vertices of the first 3D object.

5. The method of claim 2, wherein receiving data for a second 3D object further includes:
receiving data for the second 3D object indicating that two or more vertices of the second 3D object are within a threshold distance of, but not coincident with, two or more vertices of the first 3D object; and
adjusting the position of two or more vertices of the first and second 3D objects to generate two or more coincident vertices between the first and second 3D objects.

6. The method of claim 5, wherein adjusting the position of two or more vertices of the first and second 3D objects to generate two or more coincident vertices between the first and second 3D objects includes:
averaging the positions of a vertex of the first 3D object and a vertex of the second 3D object that is within a threshold distance of the vertex of the first 3D object;
adjusting the position of the vertex from the first 3D object to the averaged position; and
adjusting the position of the vertex from the second 3D object to the averaged position.

7. The method of claim 5, wherein adjusting the position of two or more vertices of the first and second 3D objects to generate two or more coincident vertices between the first and second 3D objects includes:
maintaining the position of two or more vertices of one of the first and second 3D objects; and
adjusting the position of two or more vertices of the other of the first and second 3D objects to coincide with the maintained vertices.

8. The method of claim 2, wherein rendering the adjusted version of the first 3D object includes adjusting one or more edges of the geometric mesh for the first 3D object.

9. The method of claim 8, wherein the geometric mesh is a triangular mesh, and wherein rendering the adjusted version of the first 3D object includes adjusting one or more triangles of the geometric mesh for the first 3D object.

10. A method for rendering a 3D object, comprising:
loading data into a graphics storage machine for a first 3D object at a first resolution;
receiving data for a second 3D object at a second resolution, lower than the first resolution, the second 3D object sharing a border with the first 3D object, the shared border including one or more shared edges;
for each shared edge of the shared border between the first 3D object and the second 3D object, generating a comparative element indicating a relative edge resolution of the corresponding edges of the first 3D object and the second 3D object;
for the shared border, generating a comparative index including a plurality of comparative elements for each shared edge of the shared border, the comparative index identifying a relative resolution for each edge of the shared border formed by a portion of the first 3D object;
based on the generated comparative index, calling one of a plurality of pre-determined index buffers for the first 3D object, each pre-determined index buffer indicating a different subset of vertex data corresponding to a unique permutation of shared edges for the shared border of the first 3D object, the plurality of pre-determined index buffers generated and stored at the graphics storage machine prior to generating the comparative index;

retrieving a subset of vertices from the graphics storage machine for the first 3D object based on the called pre-determined index buffer;

rendering the first 3D object based on the retrieved subset of vertices indicated in the called pre-determined index buffer; and rendering the second 3D object.

11. The method of claim 10, wherein the data for the first 3D object and the second 3D object includes coordinate locations on a heightmap for a plurality of vertices for each of the 3D objects.

12. The method of claim 10, wherein the shared border includes two or more vertices that are coincident between the first 3D object and the second 3D object.

13. The method of claim 10, further comprising:
aligning the shared border of the first 3D object and the second 3D object so that two or more border vertices of the first 3D object and the second 3D object are coincident.

14. The method of claim 10, wherein generating a comparative index indicating a relative edge resolution includes performing a bitwise-OR operation on each shared edge of the shared border.

15. The method of claim 14, wherein the bitwise-OR operation indicates whether the corresponding edge of the first 3D object has a higher resolution than the corresponding shared edge of the second 3D object.

16. The method of claim 10, wherein rendering the first 3D object based on the retrieved subset of vertices includes rendering an adjusted geometric mesh for the first 3D object based on the retrieved vertices.

17. The method of claim 10, wherein the plurality of pre-determined index buffers are loaded into the graphics storage machine at a same time as the data for the first 3D object, and wherein the plurality of pre-determined index buffers collectively indicate all possible permutations of shared edges for the shared border of the first 3D object.

18. The method of claim 10, wherein the pre-determined index buffers are loaded into the graphics storage machine prior to establishment of the shared border between the first 3D object and the second 3D object.

19. A computing system, comprising:
a central logic machine;
a central storage machine;
a graphics logic machine; and
a graphics storage machine holding instructions executable by the graphics logic machine to:
at the graphics storage machine, receive data for a first 3D object at a first resolution;
at the graphics storage machine, receive data for a second 3D object at a second resolution, lower than the first resolution;
for each shared border between the first 3D object and the second 3D object, generate a comparative index including a plurality of comparative elements for each shared edge of the shared border, the comparative index identifying relative resolutions for corresponding edges of the first and second 3D objects forming that shared edge;
generate an adjusted version of the first 3D object based on one of a plurality of pre-determined index buffers corresponding to the generated comparative index and stored at the graphics storage machine, each pre-determined index buffer indicating a different subset of vertex data corresponding to a unique permutation of shared edges for the shared border of the first 3D object, each pre-determined index buffer generated and loaded into the graphics storage machine prior to identifying relative resolutions for corresponding edges of the first and second 3D objects, and wherein for at least some shared edges of the shared border, the resolution of the corresponding edge of the first 3D object is adjusted to be equal to the resolution of the corresponding edge of the second 3D object;
render the adjusted version of the first 3D object based on a subset of vertices indicated in the pre-determined index buffer corresponding to the generated comparative index; and
render the second 3D object.

20. The computing system of claim 19, wherein the graphics storage machine further holds instructions executable by the graphics logic machine to:
based on the generated comparative index, calling one of the plurality of pre-determined index buffers for the first 3D object; and
retrieving a subset of vertices from the graphics storage machine for the first 3D object based on the generated comparative index.

* * * * *